United States Patent
Ku et al.

(10) Patent No.: US 8,990,331 B2
(45) Date of Patent: Mar. 24, 2015

(54) METHOD, APPARATUS AND SYSTEM FOR SHARING A MICROBLOG MESSAGE

(75) Inventors: Yu Ku, Shenzhen (CN); Ming Tian, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 14/125,540

(22) PCT Filed: Apr. 12, 2012

(86) PCT No.: PCT/CN2012/073902
§ 371 (c)(1),
(2), (4) Date: Dec. 11, 2013

(87) PCT Pub. No.: WO2012/171404
PCT Pub. Date: Dec. 20, 2012

(65) Prior Publication Data
US 2014/0115081 A1    Apr. 24, 2014

(30) Foreign Application Priority Data

Jun. 17, 2011    (CN) .......................... 2011 1 0163952

(51) Int. Cl.
*G06F 15/16*    (2006.01)
(52) U.S. Cl.
USPC .............................. 709/206; 709/204; 726/3
(58) Field of Classification Search
CPC ....... G06Q 20/32; G06Q 10/10; G06Q 50/01; G06Q 10/107; G06F 17/3089; G06F 17/30699; H04L 51/02; H04L 51/046; H04L 12/581; H04L 51/04; H04L 51/32
USPC ........ 709/203, 204, 206; 705/35, 42; 707/748
See application file for complete search history.

(56) References Cited

U.S. PATENT DOCUMENTS

| | | | |
|---|---|---|---|
| 2010/0150139 A1* | 6/2010 | Lawson et al. | 370/352 |
| 2010/0250672 A1* | 9/2010 | Vance et al. | 709/204 |
| 2011/0055335 A1* | 3/2011 | Reilly et al. | 709/206 |
| 2011/0099607 A1* | 4/2011 | Cohen | 726/3 |

FOREIGN PATENT DOCUMENTS

| | | |
|---|---|---|
| CN | 101860573 A | 10/2010 |
| CN | 101997743 A | 3/2011 |
| CN | 102088466 A | 6/2011 |

OTHER PUBLICATIONS

Written Opinion of the International Searching Authority (in English and Chinese) for PCT/CN2012/073902, mailed Jul. 26, 2012; ISA/CN.
International Search Report for PCT/CN2012/073902, ISA/CN, mailed Jul. 26, 2012.

* cited by examiner

*Primary Examiner* — Peling Shaw
(74) *Attorney, Agent, or Firm* — Harness, Dickey & Pierce, P.L.C.

(57) ABSTRACT

A microblog server receives sharing information required for sharing a microblog message transmitted by a microblog client. Generate a microblog data packet according to the sharing information, and transmit the microblog data packet to an instant messaging (IM) client, such that the IM client displays the microblog message to be shared according to the microblog data packet.

16 Claims, 2 Drawing Sheets

METHOD, APPARATUS AND SYSTEM FOR SHARING A MICROBLOG MESSAGE

This application is a 371 National Phase application based on PCT/CN2012/073902, filed Apr. 12, 2012, which claims the benefit of and priority to Chinese Patent Application No. 201110163952.1, filed on Jun. 17, 2011, entitled "method and system for sharing a microblog message", the disclosures of which are incorporated herein in their entirety by reference.

FIELD OF THE INVENTION

The present invention relates to computer techniques, and more particularly, to a method, an apparatus and a system for sharing a microblog message.

BACKGROUND OF THE INVENTION

At present, network Instant Messaging (IM) tools have been accepted by most Internet users and have become an indispensable software tool for the users. The IM tools have been widely used in both leisure and works of the users. The IM tools mainly realize a one-to-one friend chatting mode or a one-to-N chatting mode in a group or a discussion group. With development of Internet applications, applications of microblogs continue to grow. Microblog provides users with a new communication mode by a sentence of about 140 words. Microblogs can be spread and transferred very rapidly, which realize a one-to-indefinite chatting mode across the one-to-one and one-to-N mode. The one-to-indefinite mode means that one user may listen to microblogs distributed by millions of users.

The listening relationship of the microblog is an application of a loose relationship chain. One user may select to listen to users according to his interests. Thus, broadcast messages of these users may appear in homepage messages of a listener. However, a friend relationship in the instant messaging is an application of a strong relationship chain. It can be seen that, the listening relationship in the microblog and the friend relationship in the instant messaging complement each other to some extent.

Since the listening relationship in the microblog and the friend relationship in the instant messaging complement each other to some extent, after seeing a useful microblog message, a microblog user may desire to share this microblog message with his IM friend, so as to trigger a further communication with the IM friend.

At present, the microblog user shares the microblog message with the IM friend mainly through a pasting method which includes the following operations.

At step 11, a microblog message to be shared is copied at a microblog client or in a microblog page, the microblog message is converted into a plain text message.

At step 12, a chatting window with an IM friend is opened at an IM client or in an IM page, and the plain text message is pasted in the chatting window.

At step 13, contents in the chatting window are transmitted to the IM friend via a message tunnel with the IM friend.

It can be seen from the above that, the conventional method for sharing a microblog message with the IM friend is rather complex and inconvenient. The efficiency of sharing the microblog message is relatively low.

SUMMARY OF THE INVENTION

Examples of the present disclosure provide a method, an apparatus and a system for sharing a microblog message, so as to improve the efficiency of sharing the microblog message.

According to an example of the present disclosure, a method for sharing a microblog message is provided. The method includes:

receiving, by a microblog server, sharing information required for sharing a microblog message transmitted by a microblog client;

generating, by the microblog server, a microblog data packet according to the sharing information, and transmitting the microblog data packet to an Instant Messaging (IM) client via an IM server; or transmitting, by the microblog server, the sharing information to an IM server, generating, by the IM server, a microblog data packet according to the sharing information and transmitting the microblog data packet to the IM client.

According to another example of the present disclosure, a microblog server for sharing a microblog message is provided. The microblog server includes: a receiving module and a sharing module; wherein the receiving module is adapted to receive sharing information required for sharing a microblog message transmitted by a microblog client; and the sharing module is adapted to generate a microblog data packet according to the sharing information and transmit the microblog data packet to an Instant Messaging (IM) client via an IM server; or transmit the sharing information to an IM server which generates a microblog data packet according to the sharing information and transmits the generated microblog data packet to an IM client.

According to still another example of the present disclosure, an Instant Messaging (IM) server is provided. The IM server includes: a receiving module and a sharing module; wherein the receiving module is adapted to receive sharing information required for sharing a microblog message or a microblog data packet transmitted by a microblog server; and the sharing module is adapted to generate a microblog data packet according to the sharing information received by the receiving module and transmit the microblog data packet to an IM client; or transmit the microblog data packet received by the receiving module to an IM client.

According to yet another example of the present disclosure, a system for sharing a microblog message is provided. The system includes: a microblog client, a microblog server, an Instant Messaging (IM) server and an IM client; wherein the microblog client is adapted to receive a microblog message sharing instruction and transmitting sharing information required for sharing the microblog message to the microblog server;

the microblog server is adapted to generate a microblog data packet according to the sharing information and transmit the microblog data packet to the IM server; or adapted to transmit the sharing information to the IM server;

the IM server is adapted to transmit the microblog data packet received to the IM client; or adapted to generate a microblog data packet according to the sharing information received and transmit the generated microblog data packet to the IM client; and the IM client is adapted to receive the microblog data packet.

It can be seen from the above technical solution that, modifications are made to the microblog client, the microblog server, the IM server and the IM client in conventional systems in examples of the present disclosure. Through establishing a connection relationship between the microblog server and the IM server, an information transmission path from the microblog terminal to the microblog server and then to the IM server and then the IM client is determined, which realizes the sharing of the microblog message with the IM client. Operations such as copying the microblog message, opening an IM chatting window and pasting the microblog message are eliminated. Thus, the efficiency of sharing the microblog message is dramatically improved.

DETAILED DESCRIPTION OF THE INVENTION

The present disclosure will be described in further detail hereinafter with reference to accompanying drawings and examples to make the technical solution and merits therein clearer.

In various examples of the present disclosure, through establishing a connection relationship between a microblog server and an IM server, an information transmission path is determined between a microblog client and an IM client, which realizes the sharing of the microblog message with the IM client and improves the efficiency of sharing the microblog message dramatically.

Figure 1:
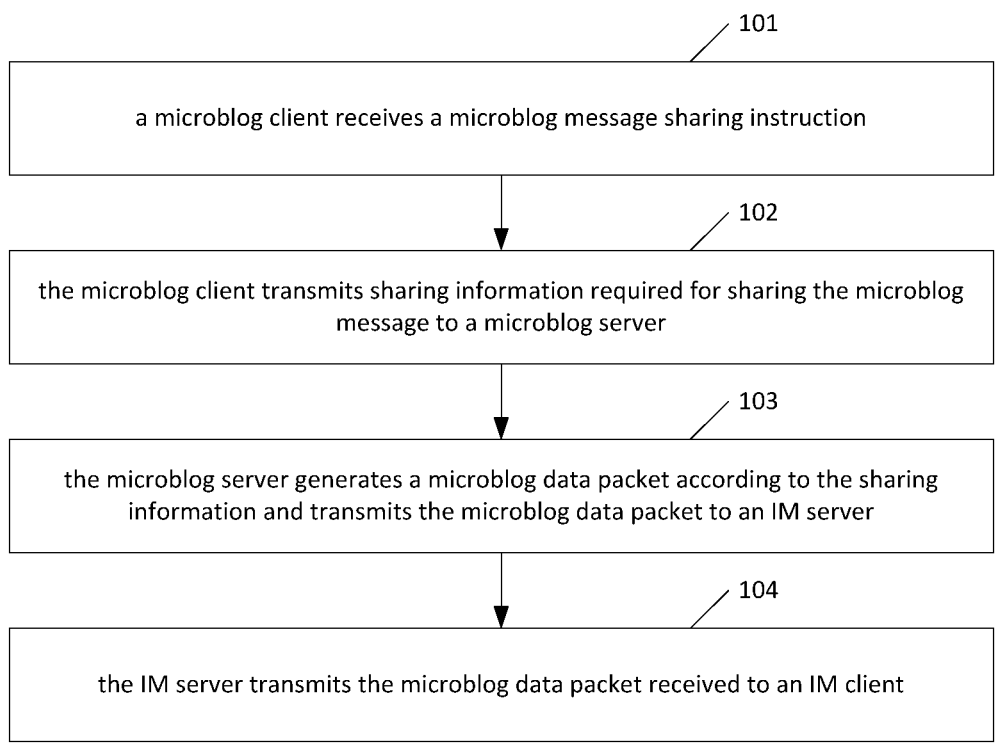
FIG. 1 is a flowchart illustrating a first method for sharing a microblog message according to an example of the present disclosure.

FIG. 1 is a flowchart illustrating a first method for sharing a microblog message according to an example of the present disclosure.

As shown in FIG. 1, the method includes the following operations.

At block 101, a microblog client receives a microblog message sharing instruction.

At block 102, the microblog client transmits sharing information required for sharing the microblog message to a microblog server.

At block 103, the microblog server generates a microblog data packet according to the sharing information and transmits the microblog data packet to an Instant Messaging (IM) server.

At block 104, the IM server transmits the microblog data packet received to an IM client.

Figure 2:
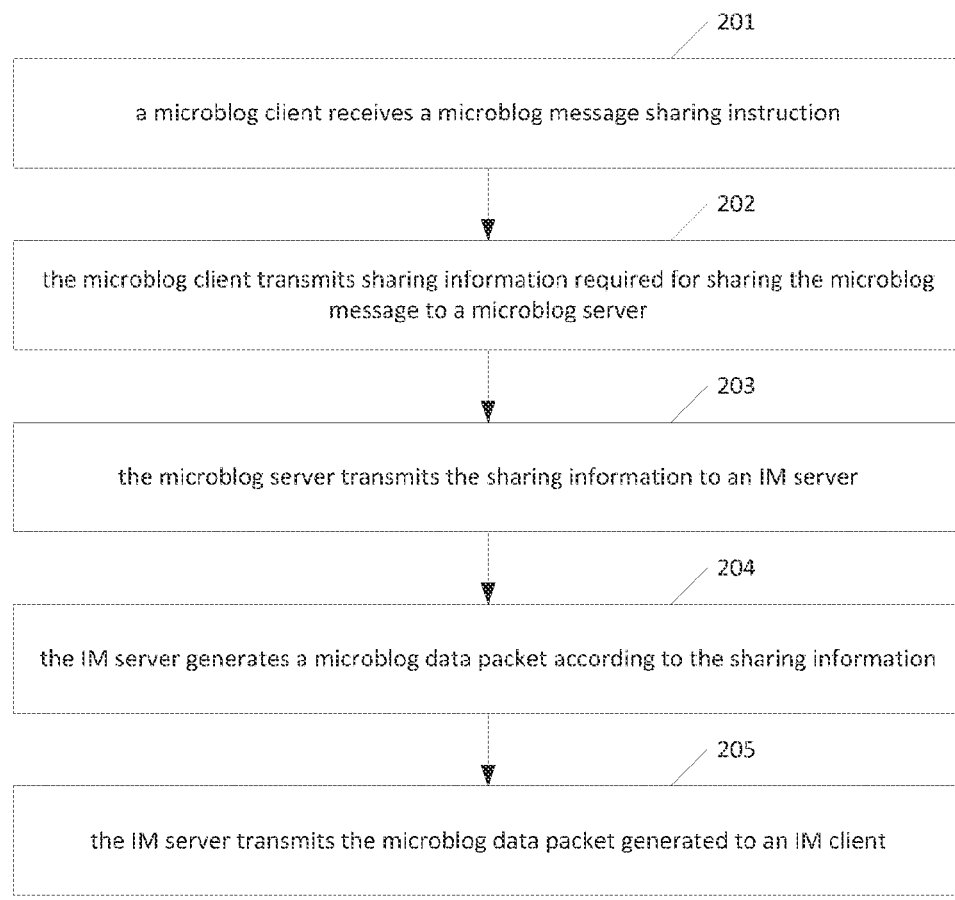
FIG. 2 is a flowchart illustrating a second method for sharing a microblog message according to an example of the present disclosure.

FIG. 2 is a flowchart illustrating a second method for sharing a microblog message according to an example of the present disclosure.

As shown in FIG. 2, the method includes the following operations.

At block 201, a microblog client receives a microblog message sharing instruction.

At block 202, the microblog client transmits sharing information required for sharing the microblog message to a microblog server.

At block 203, the microblog server transmits the sharing information to an IM server.

At block 204, the IM server generates a microblog data packet according to the sharing information.

At block 205, the IM server transmits the microblog data packet generated to an IM client.

As can be seen from FIG. 1 and FIG. 2, the difference between the method shown in FIG. 1 and that shown in FIG. 2 relies in that, in the method as shown in FIG. 1, the microblog data packet is generated by the microblog server, whereas in the method as shown in FIG. 2, the microblog data packet is generated by the IM server.

Whether being generated by the microblog server or by the IM server, at least two types of microblog data packets may be generated according to the number of versions of IM clients. In other words, in FIG. 1, the microblog server generates at least two types of microblog data packets, and in FIG. 2, the IM server generates at least two types of microblog data packets.

If at least two types of microblog data packets are generated, the IM server determines the microblog data packet to be transmitted to the IM client according to the version of the IM client. That is to say, the IM server selects, according to the version of the IM client, one type of microblog data packet to be transmitted to the IM client from the at least two types of microblog data packets received from the microblog server or generated by the IM server.

The at least two types of microblog data packet at least include: a first type microblog data packet which includes plain text information of the microblog message; and a second type microblog data packet which includes a microblog message identifier (ID).

When the first type microblog data packet is generated, if the length of the microblog message exceeds a pre-determined number of bytes, the first type microblog data packet may include only plain text information of text contents of the microblog message. For example, if the length of the microblog message exceeds 800 bytes, only the plain text information of the text contents of the microblog message is contained in the microblog data packet.

The first type microblog data packet is usually transmitted to an IM client which supports only plain text information. This type of IM client supporting only plain text information may be referred to as a first type IM client. The second type microblog data packet may be transmitted to an IM client which is able to obtain the contents of the microblog message according to the microblog message ID. This type of IM client capable of obtaining the contents of the microblog message according to the microblog message ID may be referred to as a second type IM client.

After receiving the first type microblog data packet, the first type IM client may directly display the plain text information included in the first type microblog data packet.

After receiving the second type microblog data packet, the second type IM client may obtain the contents of the microblog message according to the microblog message ID carried in the second type microblog data packet, and then displays the contents of the microblog message.

Through generating the above at least two types of microblog data packets and selecting one microblog data packet to be transmitted to the IM client according to the type of the IM client, it is possible to share the microblog message to various kinds of IM clients. Thus, the compatibility and information exhibition ability of the method and system of the present disclosure are improved.

In order to reduce a load pressure of a server due to frequent data retrieving, the second type IM client may save a relationship between the microblog message ID and the contents of the microblog message obtained from the server. Each time that the second type IM client receives a second type microblog data packet, it is determined that whether the relationship between the microblog message ID included in the second type microblog data packet and contents of the microblog message has been saved in the second type IM client. If the relationship is saved in the second type IM client, the contents of the microblog message are read out from the relationship according to the microblog message ID and are displayed. Otherwise, the contents of the microblog message are retrieved from the microblog server and are displayed. Then, a relationship between the microblog message ID and the contents of the microblog message retrieved from the microblog server is saved in the second type IM client.

In order to reduce memory occupation and save storage space, in the methods as shown in FIG. 1 and FIG. 2, the IM client may also perform a memory management operation. In particular, the IM client determines a microblog message which is not currently displayed on an interface and deletes the microblog message not currently displayed on the interface.

A message pool responsible for storing all microblog messages may be configured in the memory of the IM client. When the number of microblog messages reaches a threshold, some microblog messages are released. Generally, the message pool maintains a cited count of each microblog message, i.e., a number indicating how many interfaces are currently displaying the microblog message. In various examples of the present disclosure, the IM client may determine whether a microblog message is currently displayed on an interface according to the cited count. If it is determined that the microblog message is not currently displayed on any interface, the microblog message is deleted from the message pool, so as to release corresponding memory space and reduce memory occupation.

In the methods as shown in FIG. 1 and FIG. 2, the sharing information that the microblog client transmits to the microblog server generally includes: an IM client ID, a microblog message ID and source information of the microblog message. The sharing information may further include plain text information of the microblog message to be shared. Through transmitting the plain text information to the microblog server, the microblog server is released from finding corresponding contents of the microblog message according to the microblog message ID, which saves traffics of the microblog server and reduces the load pressure of the microblog server.

In the methods as shown in FIG. 1 and FIG. 2, if the microblog client and the IM client are integrated into one client, the microblog client has IM friend information of an IM number corresponding to the microblog client. The microblog client may display the IM friend information to the user for selection. According to a selection instruction of the user, it is possible to determine the IM friend with which the microblog message is to be shared, so as to determine the IM client ID receiving the microblog message.

In the methods as shown in FIG. 1 and FIG. 2, if the microblog client and the IM client are disposed independently, the microblog client needs to obtain the IM friend information of the IM number corresponding to the microblog client before transmitting the sharing information to the microblog server.

In particular, the microblog client transmits an IM friend information obtaining request to the IM server via the microblog server, wherein the IM friend information obtaining request contains the IM number corresponding to the microblog client. The IM server transmits, according to the IM number carried in the IM friend information obtaining request, the IM friend information corresponding to the IM number to the microblog client via the microblog server.

After obtaining the IM friend information, the microblog client is able to display the IM friend information to the user for selection. According to a selection instruction of the user, it is possible to determine the IM friend with which the microblog message is to be shared, so as to determine the IM client ID receiving the microblog message.

The IM friend may be a single IM user or may be an IM group or a discussion group.

Figure 3:
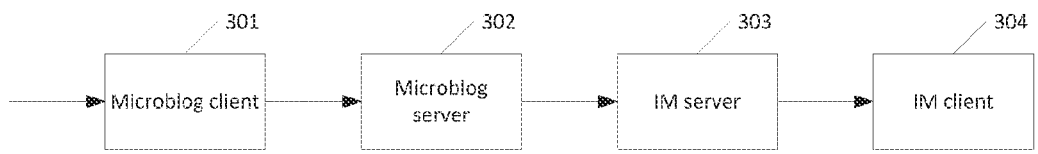
FIG. 3 is a schematic diagram illustrating a structure of a system for sharing a microblog message according to an example of the present disclosure.

FIG. 3 is a schematic diagram illustrating a structure of a system for sharing a microblog message according to an example of the present disclosure.

As shown in FIG. 3, the system includes a microblog client 301, a microblog server 302, an IM server 303 and an IM client 304.

The microblog client 301 is adapted to receive a microblog message sharing instruction and transmit sharing information required for sharing a microblog message to the microblog server 302.

The microblog server 302 is adapted to generate a microblog data packet according to the sharing information and transmit the microblog data packet to the IM server 303.

The IM server 303 is adapted to transmit the microblog data packet received to the IM client 304.

The IM client 304 is adapted to receive the microblog data packet.

The microblog server 302 is further adapted to generate at least two types of microblog data packets and transmit the at least two types of microblog data packets to the IM server 303.

The IM server 303 is further adapted to select, according to a version of the IM client 304, a microblog data packet supported by the IM client 304 from the at least two types of microblog data packets and transmit the selected microblog data packet to the IM client 304.

The at least two types of microblog data packet at least include: a first type microblog data packet which includes plain text information of the microblog message; and a second type microblog data packet which includes a microblog message ID.

The system as shown in FIG. 3 may include a first type IM client and a second type IM client.

The first type IM client is adapted to receive the first type microblog data packet and display the plain text information contained in the first type microblog data packet.

The second type IM client is adapted to receive the second type microblog data packet, obtain contents of the microblog message according to the microblog message ID contained in the second type microblog data packet and display the contents of the microblog message.

The second type IM client includes a receiving module, an obtaining module, a storage module and a displaying module.

The receiving module is adapted to receive the second type microblog data packet.

The obtaining module is adapted to determine whether the storage module has the contents of the microblog message corresponding to the microblog message ID contained in the second microblog data packet, and read the contents of the microblog message corresponding to the microblog message ID contained in the second microblog data packet from the storage module if the storage module has the contents of the microblog message, and retrieve the contents of the microblog message corresponding to the microblog message ID from the microblog server if otherwise.

The storage module is adapted to store a relationship between the microblog message ID and the contents of the microblog message.

The displaying module is adapted to display the contents of the microblog message.

The IM client 304 may further include a memory managing module.

The memory managing module is adapted to determine a microblog message which is not currently displayed on any interface and delete the microblog message which is not currently displayed on any interface.

The sharing information may include an ID of the IM client 304, the microblog message ID and source information of the microblog message. The sharing information may further include the plain text information of the microblog message.

If the microblog client 301 does not have IM friend information of an IM number corresponding to the microblog client 301, the microblog client 301 is adapted to receive the microblog message sharing instruction, transmit an IM friend information obtaining request to the IM server 303 via the microblog server 302, wherein the IM friend information obtaining request contains the IM number corresponding to the microblog client 301, receive the IM friend information returned by the microblog server 302, receive an instruction of selecting the ID of the IM client 304 from the IM friend information, transmit the ID of the IM client 304, the microblog message ID and the source information of the microblog message to the microblog server 302.

The microblog server 302 is adapted to forward the IM friend information obtaining request transmitted by the microblog client 301 to the IM server 303, and forward the IM friend information transmitted by the IM server 303 to the microblog client 301.

The IM server 303 is adapted to transmit the IM friend information to the microblog client 301 via the microblog server 302 according to the IM friend information obtaining request forwarded by the microblog server 302.

The microblog client 301 and the IM client 304 may be integrated into one client.

In the example of the present disclosure, the IM client 304 may be designed using a loose-coupled structure and may be implemented via a multi-layer model. Relevant logic functions are encapsulated in one layer. Communications between layers may be realized via an interface or an abstract data structure such as a pure virtual function, so as to make codes more reusable. In particular, the IM client 304 may include a displaying layer, a service logic layer and a data layer.

The displaying layer includes a displaying controller of the microblog message and a man-machine interaction interface.

The service logic layer is adapted to perform a service logic processing to the microblog message.

The data layer is adapted to obtain and store microblog message data to be displayed.

As an example, in the system as shown in FIG. 3, the microblog server 302 may also transmit the sharing information to the IM server 303, and the IM server 303 generates the microblog data packet and transmits the microblog data packet to the IM client 304.

If the entity generating the microblog data packet changes from the microblog server 302 to the IM server 303, the IM server 303 may generate the at least two types of microblog data packets, selects, according to the version of the IM client 304, a microblog data packet supported by the IM client 304 from the at least two types of microblog data packets and transmit the selected microblog data packet to the IM client 304.

It can be seen from the above that, if the entity generating the microblog data packet changes from the microblog server 302 to the IM server 303, except for the change of the entity generating the microblog data packet, other functions and structures in the system as shown in FIG. 3 remain unchanged.

For example, if the entity generating the microblog data packet changes from the microblog server 302 to the IM server 303, the at least two types of microblog data packets may include: a first type microblog data packet which carries plain text information of the microblog message, and a second type microblog data packet which carries the microblog message ID. The system may further includes a first type IM client which is adapted to receive the microblog data packet carrying the plain text information, and may further include a second type IM client which is adapted to obtain contents of the microblog message according to the microblog message ID and display the contents of the microblog message.

In accordance with the above technical solution, examples of the present disclosure further provide a microblog server and an IM server.

The microblog server provided by the examples of the present disclosure includes a first receiving module and a first sharing module.

The first receiving module is adapted receive sharing information required for sharing a microblog message transmitted by a microblog client.

The first sharing module is adapted to generate a microblog data packet according to the sharing information and transmit the microblog data packet to an IM client via an IM server; or adapted to transmit the sharing information to an IM server which generates a microblog data packet according to the sharing information and transmits the microblog data packet to an IM client.

The first sharing module is further adapted to generate at least two types of microblog data packets, select a microblog data packet supported by the IM client from the at least two types of microblog data packets according to a version of the IM client and transmit the selected microblog data packet to the IM client via the IM server.

The first sharing module is further adapted to forward an IM friend information obtaining request transmitted by the microblog client to the IM server, and forward IM friend information transmitted by the IM server to the microblog client.

The IM server provided by examples of the present disclosure includes a second receiving module and a second sharing module.

The second receiving module is adapted to receive sharing information required for sharing a microblog message or a microblog data packet from a microblog server.

The second sharing module is adapted to generate a microblog data packet according to the sharing information received by the second receiving module and transmit the microblog data packet to an IM client, or adapted to transmit the microblog data packet received by the second receiving module to an IM client.

The second sharing module is adapted to generate at least two types of microblog data packets according to the sharing information received by the second receiving module; or adapted to receive at least two types of microblog data packets.

The second sharing module is further adapted to select a microblog data packet supported by the IM client from the at least two types of microblog data packets according to a version of the IM client and transmit the selected microblog data packet to the IM client.

Through the technical solution provided by the examples of the present disclosure, a microblog user may share a useful microblog message with an IM friend.

According to the technical solution provided by the examples of the present disclosure, it is possible to generate a microblog data packet according to the type of the client of the IM friend and transmit the microblog data packet to the IM client, which meets the requirement of various IM clients and increases exhibition ability of the microblog message.

What has been described and illustrated herein is a preferred example of the disclosure along with some of its variations. Many variations are possible within the spirit and scope of the disclosure, which is intended to be defined by the following claims—and their equivalents—in which all terms are meant in their broadest reasonable sense unless otherwise indicated.

What is claimed is:

1. A method for sharing a microblog message, comprising:
    receiving, by a microblog server, sharing information required for sharing a microblog message transmitted by a microblog client, wherein the sharing information comprises: an ID of the IM client, the microblog message ID and source information of the microblog message;
    generating, by the microblog server, a microblog data packet according to the sharing information, and transmitting the microblog data packet to an Instant Messaging (IM) client via an IM server; or transmitting, by the microblog server, the sharing information to an IM server, generating, by the IM server, a microblog data packet according to the sharing information and transmitting the microblog data packet to the IM client;
    before the microblog server receives the sharing information required for sharing the microblog message transmitted by the microblog client, the method further comprises:
    transmitting, by the microblog server, an IM friend information obtaining request transmitted by the microblog client to the IM server; wherein the IM friend information obtaining request carries an IM number corresponding to the microblog client;
    transmitting, by the microblog server, IM friend information corresponding to the IM number obtained by the IM server according to the IM number carried in the IM friend information obtaining request to the microblog client, wherein the ID of the IM client in the sharing information is selected from the IM friend information.

2. The method of claim 1, wherein the generating the microblog data packet comprises: generating at least two types of microblog data packets;
    the transmitting the microblog data packet to the IM client comprises:
    selecting a microblog data packet supported by the IM client from the at least two types of microblog data packets according to a version of the IM client, and transmitting the selected microblog data packet to the IM client.

3. The method of claim 2, wherein the at least two types of microblog data packets comprise:
    a first type microblog data packet, which carries plain text information of the microblog message; and
    a second type microblog data packet, which carries an Identifier (ID) of the microblog message;
    the method further comprises:
    after receiving the first type microblog data packet, displaying, by the IM client, the plain text information carried in the first type microblog data packet; and
    after receiving the second type microblog data packet, obtaining, by the IM client, contents of the microblog message according to the microblog message ID carried in the second type microblog data packet, and displaying the contents of the microblog message.

4. The method of claim 3, wherein
    after receiving the second type microblog data packet, determining, by the IM client according to the microblog message ID carried in the second type microblog data packet, whether the IM client stores a relationship between the microblog message ID and the contents of the microblog message;
    if the IM client stores the relationship, reading the contents of the microblog message corresponding to the microblog message ID from the relationship, and displaying the contents of the microblog message read out from the relationship;
    otherwise, obtaining the contents of the microblog message from the microblog server, displaying the contents of the microblog message obtained from the microblog server, and storing a relationship between the microblog message ID and the contents of the microblog message obtained from the microblog server.

5. The method of claim 1, further comprising:
    determining, by the IM client, a microblog message which is currently not displayed on an interface, and deleting the microblog message which is currently not displayed on the interface.

6. The method of claim 1, wherein the sharing information further comprises the plain text information of the microblog message.

7. A microblog server, comprising: a receiving module and a sharing module; wherein
    the receiving module is adapted to receive sharing information required for sharing a microblog message transmitted by a microblog client; and
    the sharing module is adapted to
        generate a microblog data packet according to the sharing information and transmit the microblog data packet to an Instant Messaging (IM) client via an IM server; or
        transmit the sharing information to an IM server which generates a microblog data packet according to the sharing information and transmits the generated microblog data packet to an IM client;
    the sharing module is further adapted to
        receive an IM friend information obtaining request transmitted by the microblog client;
        forward the IM friend information obtaining request to the IM server;
        receive IM friend information transmitted by the IM server; and
        forward the IM friend information to the microblog client.

8. The microblog server of claim 7, wherein
    the sharing module is further adapted to
        generate at least two types of microblog data packets according to the sharing information;
        select a microblog data packet supported by the IM client from the at least two types of microblog data packets according to a version of the IM client; and
        transmit the selected microblog data packet to the IM client via the IM server.

9. A system for sharing a microblog message, comprising: a microblog client, a microblog server, an Instant Messaging (IM) server and an IM client; wherein
    the microblog client is adapted to receive a microblog message sharing instruction and transmitting sharing information required for sharing the microblog message to the microblog server, wherein the sharing information comprises: an ID of the IM client, the microblog message ID and source information of the microblog message;

the microblog server is adapted to generate a microblog data packet according to the sharing information and transmit the microblog data packet to the IM server; or adapted to transmit the sharing information to the IM server;

the IM server is adapted to transmit the microblog data packet received to the IM client; or adapted to generate a microblog data packet according to the sharing information received and transmit the generated microblog data packet to the IM client; and the IM client is adapted to receive the microblog data packet;

the microblog client is further adapted to
receive the microblog message sharing instruction,
transmit an IM friend information obtaining request to the IM server via the microblog server, wherein the IM friend information obtaining request contains an IM number corresponding to the microblog client,
receive IM friend information returned by the microblog server,
receive an instruction of selecting the ID of the IM client from the IM friend information, and
transmit the ID of the IM client, the microblog message ID and the source information of the microblog message to the microblog server;

the microblog server is further adapted to forward the IM friend information obtaining request transmitted by the microblog client to the IM server, and forward the IM friend information transmitted by the IM server to the microblog client; and the IM server is adapted to transmit the IM friend information to the microblog client via the microblog server according to the IM friend information obtaining request forwarded by the microblog server.

10. The system of claim 9, wherein
the microblog server is further adapted to generate at least two types of microblog data packets and transmit the at least two types of microblog data packets to the IM server;

the IM server is further adapted to select, according to a version of the IM client, a microblog data packet supported by the IM client from the at least two types of microblog data packets and transmit the selected microblog data packet to the IM client.

11. The system of claim 10, wherein the at least two types of microblog data packet at least comprises:
a first type microblog data packet which includes plain text information of the microblog message; and
a second type microblog data packet which includes an ID of the microblog message;
the system further comprises a first type IM client and a second type IM client;

the first type IM client is adapted to receive the first type microblog data packet and display the plain text information contained in the first type microblog data packet; and the second type IM client is adapted to receive the second type microblog data packet, obtain contents of the microblog message according to the microblog message ID contained in the second type microblog data packet and display the contents of the microblog message.

12. The system of claim 11, wherein the second type IM client comprises a receiving module, an obtaining module, a storage module and a displaying module; wherein
the receiving module is adapted to receive the second type microblog data packet;
the obtaining module is adapted to
determine whether the storage module stores contents of the microblog message corresponding to the microblog message ID contained in the second microblog data packet,
read the contents of the microblog message corresponding to the microblog message ID contained in the second microblog data packet from the storage module if the storage module stores the contents of the microblog message, and
retrieve the contents of the microblog message corresponding to the microblog message ID from the microblog server if otherwise;
the storage module is adapted to store a relationship between the microblog message ID and the contents of the microblog message; and
the displaying module is adapted to display the contents of the microblog message.

13. The system of claim 9, wherein the IM client further comprises a memory managing module;
the memory managing module is adapted to determine a microblog message which is not currently displayed on any interface, and delete the microblog message which is not currently displayed on any interface.

14. The system of claim 9, wherein the sharing information further comprises the plain text information of the microblog message.

15. The system of claim 9, wherein the microblog client and the IM client are integrated into one client.

16. The system of claim 15, wherein the IM client comprises a displaying layer, a service logic layer and a data layer; wherein
the displaying layer includes a displaying controller for displaying the microblog message and a man-machine interacting module;
the service logic layer is adapted to perform a service logic processing to the microblog message; and
the data layer is adapted to obtain and store microblog message data to be displayed.

* * * * *